United States Patent
Bish et al.

(10) Patent No.: US 12,173,099 B2
(45) Date of Patent: Dec. 24, 2024

(54) CURABLE FLUOROELASTOMER COMPOSITIONS

(71) Applicant: DUPONT POLYMERS, INC., Wilmington, DE (US)

(72) Inventors: Christopher J. Bish, Kennett Square, PA (US); Christian Daniel, Thoiry (SZ); Daniel Robert Massa, Wilmington, DE (US)

(73) Assignee: DUPONT POLYMERS, INC., Wilmington, DE (US)

( * ) Notice: Subject to any disclaimer, the term of this patent is extended or adjusted under 35 U.S.C. 154(b) by 546 days.

(21) Appl. No.: 17/594,848

(22) PCT Filed: May 7, 2020

(86) PCT No.: PCT/US2020/031801
§ 371 (c)(1),
(2) Date: Nov. 1, 2021

(87) PCT Pub. No.: WO2020/227485
PCT Pub. Date: Nov. 12, 2020

(65) Prior Publication Data
US 2022/0306782 A1 Sep. 29, 2022

Related U.S. Application Data

(60) Provisional application No. 62/844,334, filed on May 7, 2019.

(51) Int. Cl.
C08F 214/26 (2006.01)
C08K 3/04 (2006.01)
C08K 5/24 (2006.01)

(52) U.S. Cl.
CPC ............ *C08F 214/262* (2013.01); *C08K 3/04* (2013.01); *C08K 5/24* (2013.01)

(58) Field of Classification Search
None
See application file for complete search history.

(56) References Cited

U.S. PATENT DOCUMENTS

| | | |
|---|---|---|
| 4,281,092 A | 7/1981 | Breazeale |
| 4,394,489 A | 7/1983 | Aufdermarsh |
| 5,554,680 A | 9/1996 | Ojakaar |
| 5,789,489 A | 8/1998 | Coughlin et al. |
| 5,789,509 A | 8/1998 | Schmiegel |
| 6,281,296 B1 | 8/2001 | MacLachlan et al. |
| 6,638,999 B2 | 10/2003 | Bish et al. |
| 7,977,426 B2 | 7/2011 | Peng et al. |
| 7,999,049 B2 | 8/2011 | Coughlin et al. |
| 8,338,542 B1 * | 12/2012 | Bish ........................ C08K 5/25 525/326.3 |
| 8,765,875 B2 | 7/2014 | Bish et al. |
| 8,765,876 B2 | 7/2014 | Bish et al. |
| 9,169,339 B2 | 10/2015 | Hirano |
| 2002/0026014 A1 * | 2/2002 | Bish ..................... C08K 5/0025 525/326.3 |
| 2011/0095969 A1 | 4/2011 | Ueda |
| 2013/0072656 A1 * | 3/2013 | Bish ........................ C08L 71/00 528/369 |
| 2013/0190456 A1 * | 7/2013 | Hirano ................... C08L 27/18 264/236 |

FOREIGN PATENT DOCUMENTS

| | | | | |
|---|---|---|---|---|
| WO | 199719982 | 6/1997 | | |
| WO | 2011084404 A2 | 7/2011 | | |
| WO | WO-2014004419 A1 * | 1/2014 | ............ | C08F 214/26 |
| WO | 2017132706 A1 | 8/2017 | | |
| WO | 2018038917 A1 | 3/2018 | | |

\* cited by examiner

*Primary Examiner* — Nicole M. Buie-Hatcher
(74) *Attorney, Agent, or Firm* — Matthew T. Fewkes

(57) ABSTRACT

Provided herein is a curable fluoroelastomer composition including at least one fluoroelastomer comprising copolymerized units of a nitrile group-containing cure site monomer; a cure system comprising at least two different dihydrazides; and optionally at least one additive. Further provided are pre-forms comprising the curable composition, methods of curing the fluoroelastomer composition, compositions that are the product of curing the curable fluoroelastomer composition, and articles comprising the cured fluoroelastomer composition.

15 Claims, No Drawings

CURABLE FLUOROELASTOMER COMPOSITIONS

CROSS-REFERENCE TO RELATED APPLICATION

This application is a U.S. national stage filing under 35 U.S.C. § 371 of PCT Application No. PCT/US20/031801, filed May 7, 2020, currently pending, which claims the benefit of U.S. patent application Ser. No. 62/844,334, filed May 7, 2019, under 35 U.S.C. § 119 (e). PCT Application No. PCT/US20/031801, and U.S. patent application Ser. No. 62/844,334 are hereby incorporated by reference.

FIELD OF THE INVENTION

Described herein are curable fluoroelastomer compositions and, more particularly, curable fluoroelastomer compositions comprising a mixture of two or more dihydrazide curing agents.

BACKGROUND OF THE INVENTION

Several patents and publications are cited in this description in order to more fully describe the state of the art to which this invention pertains. The entire disclosure of each of these patents and publications is incorporated by reference herein.

Fluoroelastomers have achieved outstanding commercial success and are used in a wide variety of applications in which severe environments are encountered, in particular those end uses where exposure to high temperatures and aggressive chemicals occurs. For example, these polymers are often used as down-well drill bit seals in the oil and gas industry where the drilling assembly is exposed to aqueous environments at high temperatures and pressures followed by rapid return to atmospheric pressure. However, there is a constant need for seals for use in these extreme environments which exhibit a desirable combination of low temperature sealing performance in combination with rapid gas decompression resistance and hot water resistance.

The outstanding properties of fluoroelastomers are largely attributable to the stability and inertness of the copolymerized fluorinated monomer units that make up the major portion of the polymer backbones in these compositions. Such monomers include vinylidene fluoride, hexafluoropropylene, tetrafluoroethylene and perfluoro(alkyl vinyl) ethers. In order to develop elastomeric properties fully, fluoroelastomers are typically crosslinked, i.e., vulcanized or cured. To this end, a small percentage of cure site monomer is copolymerized with the fluorinated monomer units. Cure site monomers containing at least one nitrile group, for example perfluoro-8-cyano-5-methyl-3,6-dioxa-1-octene, are especially preferred. The cure sites cross-link the fluoropolymers by reacting with one or more curatives, for example diamine compounds, bisphenol compounds, and peroxide compounds. Such polymers and compositions are described in U.S. Pat. Nos. 4,281,092; 4,394,489; 5,789,489; and 5,789,509; and in Intl. Pat. Appln. Publn. No. WO2011/084404.

Other nitrogen-containing nucleophilic compounds have been employed to crosslink fluoroelastomers having nitrile group cure sites. See, for example, U.S. Pat. No. 6,638,999 B2. Some of these curatives are scorchy crosslinking may begin before the final shaping of the composition), while others are volatile at rubber milling temperatures.

It has now been discovered that when a mixture of two or more different dihydrazide curing agents is used as a curing system for fluoroelastomer compositions, the cured compositions can exhibit improved physical properties, especially for use in the oil and gas industry in down-hole applications.

SUMMARY OF THE INVENTION

Accordingly, provided herein is a curable fluoroelastomer composition including at least one fluoroelastomer comprising copolymerized units of a nitrile group-containing cure site monomer; a cure system comprising at least two different dihydrazides; and optionally at least one additive. Further provided are methods of curing the fluoroelastomer composition, pre-forms comprising the curable fluoroelastomer composition, cured fluoroelastomer compositions that are the product of cross-linking the curable fluoroelastomer composition, and articles comprising the cured fluoroelastomer compositions.

DETAILED DESCRIPTION OF THE INVENTION

Abbreviations

"phr" refers to parts per hundred parts of fluoroelastomer (rubber); one of skill in the art uses and recognizes this term of measurement. For example, 3 parts of a component per 100 parts fluoroelastomer is written as 3 phr. In the compounds, processes, and articles described herein, phr is based on 100 parts of fluoroelastomer A.

"t90" refers to the time in minutes required for the torque to reach 90% of its maximum at a given temperature when a force is applied to a curable fluoroelastomer composition, as measured by a moving die rheometer or similar instrument.

"g" refers to grams

"MPa" refers to megapascal.

"%" refers to the term percent.

"mole %" refers to mole percent

Definitions

The following definitions are used herein to further define and describe the disclosure. These definitions apply to the terms as used throughout this specification, unless otherwise limited in specific instances.

Unless otherwise defined, all technical and scientific terms used herein have the same meaning as commonly understood by one of ordinary skill in the art to which this invention belongs. In case of conflict, the present specification, including the definitions set forth herein, will control.

Unless explicitly stated otherwise in defined circumstances, all percentages, parts, ratios, and like amounts used herein are defined by weight.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" or "consisting of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format.

In addition, the term "consisting essentially of" as used herein refers to compositions that include greater than 95 weight % or greater than 99 weight % of the recited component(s), based on the total weight of the composition. Moreover, optional additives as defined herein, at levels that are appropriate for such additives, and minor impurities are not excluded from a composition by the term "consisting essentially of". Thus, compositions to which this term is applied may include one or more other components or additives such those described below, including any carrier(s) that may be introduced with the other component(s) or additive(s). In these amounts, the other component(s), the additive(s) and their carrier(s) do not change the basic and novel characteristics of the phases or compositions described herein.

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

Further in this connection, certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

Further, unless expressly stated to the contrary, the conjunction "or" refers to an inclusive or and not to an exclusive or. For example, the condition "A or B" is satisfied by any one of the following: A is true (or present) and B is false (or not present), A is false (or not present) and B is true (or present), and both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Moreover, the ranges set forth herein include their endpoints unless expressly stated otherwise in limited circumstances. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range, but rather includes every real number within the range, inclusive of its endpoints.

In addition, any description of a variant of materials, chemical entities, methods, steps, values, ranges, etc., whether identified as preferred or not, of the processes, compounds and articles described herein specifically includes the combination of the variant with the other materials, methods, steps, values, ranges, etc., that make up or form the processes, compounds and articles described herein.

The term "perfluoro" as used herein alone or in combined form, such as for example "perfluoroelastomer" and "perfluorovinylether", refers to a molecule or moiety in which every hydrogen atom is substituted with a fluorine atom. For example, the term "perfluoroacetone" refers to the compound $(CF_3)_2C=O$, and the term "perfluorinated olefin" refers to linear, branched, or cyclic structures which comprise at least one unsaturated double bond and which comprise fluorine atoms and carbon atoms, but no hydrogen atoms.

As used herein, the term "fluoro", when as used herein alone or in combined form, such as for example "fluoroelastomer" and "fluorovinyl ether", refers to a molecule or moiety in which at least one fluorine atom is substituted for a hydrogen atom. The prefix "fluoro-", when placed as a prefix before a chemical entity name, expressly includes "perfluoro-" chemical entities. Thus, the prefix "fluoro-", when preceding a chemical entity name, indicates both "fluoro-" entities and "perfluoro-" entities.

As used herein, the term "alkyl" refers to linear, branched, or cyclic hydrocarbon structures and combinations of two or more of these structures.

The term "alkyl" does not include unsaturated or aromatic structures. Examples of linear alkyl groups include methyl, ethyl, propyl, butyl, pentyl, and hexyl groups. Branched alkyl groups include for example sec-butyl, tert-butyl, and isopropyl groups. Examples of cyclic hydrocarbon groups include cyclopropyl, cyclopentyl, cyclohexyl, cyclobutyl, and cyclooctyl groups.

As used herein, the term "alkoxy" or "alkoxyl" refers to alkyl groups attached to an oxygen atom by a single bond. The other bond of the oxygen atom is connected to a carbon atom. Examples include methoxy, ethoxy, propoxy, isopropoxy, butoxy, cyclopropyloxy, cyclopentyloxy, and cyclohexyloxy.

The term "cure", as used herein whether alone or in combined form, such as "cured", "curing", or "curable", is synonymous and used interchangeably with the terms "cross-link" and "vulcanize" to refer to polymers that comprise reactive moieties, wherein said reactive moieties have been reacted to form covalent bonds, at least a portion of which are covalent bonds between two polymer molecules. The curable fluoroelastomer composition described herein may be cured to form sufficient crosslinks such that the resultant cured fluoroelastomer composition cannot be thermally processed, for example, molded or extruded. That is, when the curable fluoroelastomer composition is exposed to curing conditions, for example in a compression-molding process, and has thereby been cured to form an article, that article cannot be re-molded to take on a substantially different form or shape, configuration, or structure. Stated alternatively, the cured fluoroelastomer compositions are thermoset materials.

The resultant entity of the curing process is a "cured" entity, that is, a bulk fluoroelastomer or an article as defined herein above. Curing results in compounds taking on a form or shape or configuration or structure of an article. Cured articles of compounds described herein include, but are not limited to, blocks, slabs, O-rings, seals, and gaskets.

The term "cure" also expressly includes differing degrees of cross-linking a curable composition, such as by controlling the stoichiometry of curing sites or cross-linking agents, or by controlling curing conditions, such as time, temperature, or pressure. It may be desirable to vary certain physical properties of the cured compositions by varying the extent of the curing. Stated alternatively, the curable fluoroelastomer compositions described herein may be partially cross-linked, completely cross-linked, or substantially completely cross-linked, depending on the desired properties of the cured fluoroelastomer compositions or articles.

The cured fluoroelastomer compositions or the articles comprising the cured fluoroelastomer compositions may also be "post-cured", that is, subjected to additional curing conditions, which provide further, subsequent curing. Curable compositions that have undergone more than one curing cycle, i.e., "post-cured" compositions, may also be referred to as "cured."

Generally

The curable fluoroelastomer compositions described herein comprise at least one fluoroelastomer having nitrile group cure sites and a cure system comprising at least two different dihydrazide curing agents. Preferably, the curable fluoroelastomer compositions comprise:

A) at least one fluoroelastomer comprising copolymerized units of a nitrile group-containing cure site monomer;
B) a cure system comprising a mixture of two or more different dihydrazides; and
C) optionally at least one additive.

Further provided are pre-forms comprising the curable fluoroelastomer composition, methods of curing the curable fluoroelastomer compositions, the resulting cured fluoroelastomer compositions, and articles comprising the cured fluoroelastomer compositions.

A) Fluoroelastomer

The curable fluoroelastomers preferably contain between 25 and 70 weight percent, based on the total weight of the curable fluoroelastomer, of copolymerized units of at least one first monomer that is a fluorinated alkene.

Suitable first monomers include but are not limited to 1,1-difluoroethylene ($C_2H_2F_2$), hexafluoro-propylene (HFP), tetrafluoroethylene (TFE), 1,2,3,3,3-pentafluoropropene (1-HPFP), 1,1,3,3,3-pentafluoropropene (2-HPFP), chlorotrifluoroethylene (CTFE), 1,1,2-trifluoro-ethylene, 1-fluoroethylene, and combinations of two or more of these first monomers. The curable fluoroelastomer further comprises copolymerized residues of a second monomer that is a fluorovinyl ether and copolymerized units of a cure site monomer. Optionally, curable fluoroelastomer (A) may further comprise copolymerized units of one or more additional copolymerized monomers, different from said first monomer, said second monomer, and said cure site monomer.

Suitable fluorine-containing vinyl ethers for use as monomer (ii) to make fluoroelastomers include but are not limited to fluoro(alkyl vinyl) ethers. Preferred are perfluoro(alkyl vinyl) ethers (PAVE). Suitable perfluoro(alkyl vinyl) ethers for use as monomers include those of the formula $$CF_2=CFO(R_{f'}O)_n(R_{f''}O)_mR_f \quad (I)$$

where $R_{f'}$ and $R_{f''}$ are different linear or branched perfluoroalkylene groups of 2 to 6 carbon atoms; m and n are integers independently selected from the range of 0 to 10; and $R_f$ is a perfluoroalkyl group of 1 to 6 carbon atoms.

A preferred class of perfluoro(alkyl vinyl) ethers includes compositions of the formula $$CF_2=CFO(CF_2CFXO)_nR_f \quad (II)$$

where X is F or $CF_3$; n is an integer in the range of 0 to 5; and $R_f$ is a perfluoroalkyl group of 1 to 6 carbon atoms.

A more preferred class of perfluoro(alkyl vinyl) ethers includes compositions of the formula $$CF_3O-(CF_2O)_n-CF_2CF_2-OCF=CF_2 \quad (III)$$

where n is an integer in the range of 0 to 5. An example of a more preferred perfluorinated ether is 1-[2-[difluoro(trifluoromethoxy) methoxy]-1,1,2,2-tetrafluoroethoxy]-1,2,2-trifluoroethene.

A still more preferred class of perfluoro(alkyl vinyl) ethers includes those ethers wherein n is 0 or 1 and $R_f$ contains 1, 2, or 3 carbon atoms. Examples of such perfluorinated ethers include, without limitation, perfluoro(methyl vinyl) ether (PMVE), perfluoro(ethyl vinyl) ether (PEVE), and perfluoro(propyl vinyl) ether (PPVE).

Other suitable perfluoro(alkyl vinyl) ethers include those of the formula $$CF_2=CFO[(CF_2)_mCF_2CFZO]_nR_f \quad (IV)$$

where $R_f$ is a perfluoroalkyl group having 1 to 6 carbon atoms; m=0 or 1; n=0, 1, 2, 3, 4, or 5; and Z=F or $CF_3$. Preferred members of this class are those in which $R_f$ is $C_3F_7$, m=0, and n=1.

Additional suitable perfluoro(alkyl vinyl) ether monomers include compounds of the formula $$CF_2=CFO[(CF_2CF\{CF_3\}O)_n(CF_2CF_2CF_2O)_m(CF_2)_p]C_xF_{2x+1} \quad (V)$$

where m and n are integers independently selected from the range of 0 to 10; p=0, 1, 2, or 3; and x=1, 2, 3, 4, or 5. Preferred members of this class include compounds where n=0 or 1; m=0 or 1; and x=1.

Other examples of useful perfluoro(alkyl vinyl) ethers include $$CF_2=CFOCF_2CF(CF_3)O(CF_2O)_mC_nF_{2n+1} \quad (VI)$$

where n=1, 2, 3, 4, or 5; m=1, 2, or 3; and where, preferably, n=1.

When copolymerized units of PAVE are present in the curable fluoroelastomers, the content of copolymerized PAVE units generally ranges from 25 to 75 weight percent, preferably from 35 to 65 weight percent, based on the total weight of the curable fluoroelastomer. When perfluoro(methyl vinyl) ether is used, the curable fluoroelastomer preferably contains between 40 and 60 wt % of copolymerized PMVE units.

The curable fluoroelastomer further contains nitrile group-containing cure site monomers, generally in amounts of from 0.1 to 5 weight percent. The range is preferably between 0.5 to 3.5 weight percent and more preferably from 1 to 3 weight percent, based on the total weight of the curable fluoroelastomer. Suitable cure site monomers include nitrile-containing perfluorinated olefins and nitrile-containing perfluorinated vinyl ethers. Useful nitrile-containing cure site monomers include those of the formulas shown below.

$$CF_2=CF-O(CF_2)_n-CN \quad \text{(VII)}$$

where n is is selected from the range of 2 to 12, preferably from the range of 2 to 6;

$$CF_2=CF-O[CF_2-CFCF_3-O]_n-CF_2-CFCF_3-CN \quad \text{(VIII)}$$

where n is 0, 1, 2, 3, or 4, preferably 0, 1, or 2;

$$CF_2=CF-[OCF_2CFCF_3]_x-O-(CF_2)_n-CN \quad \text{(IX)}$$

where x is 1 or 2, and n is 1, 2, 3, or 4; and $$CF_2=CF-O-(CF_2)_n-O-CF(CF_3)CN \quad \text{(X)}$$

where n is 2, 3, or 4.

Nitrile-containing perfluorinated vinyl ethers of formula (VIII) are preferred. More preferred cure site monomers are perfluorinated polyethers having a nitrile group and a trifluorovinyl ether group. A still more preferred cure site monomer is $$CF_2=CFOCF_2CF(CF_3)OCF_2CF_2CN \quad \text{(XI)}$$

i.e. perfluoro(8-cyano-5-methyl-3,6-dioxa-1-octene) or 8-CNVE.

Suitable optional additional monomers include, without limitation, hydrocarbon olefins. Suitable hydrocarbon olefins include but are not limited to ethylene and propylene. Cure site monomers that do not comprise nitrile groups, such as for example the isomers of trifluoropropylene (TFP) and the isomers of bromotetrafluorobutene (BTFB), are also suitable additional monomers. When copolymerized units of a hydrocarbon olefin are present in the curable fluoroelastomers, they are present at a level of 0.1 to 30 wt %, or 4 to 30 wt %, or 0.1 to 25 wt %, 0.1 to 20 wt %, 0.1 to 15 wt %, 0.1 to 10 wt %, or 0.1 to 5 wt %, based on the total weight of the curable fluoroelastomer. One suitable curable fluoroelastomer that comprises an optional additional monomer is TFE/Propylene/BTFB/TFP/CNVE.

Preferably, curable fluoroelastomer (A) comprises copolymerized units of:
i) at least one first monomer which is a perfluorinated olefin;
ii) at least one second monomer which is a perfluorovinyl ether; and
iii) one or more nitrile group-containing cure site monomers selected from the group consisting of nitrile-containing perfluorinated olefins and nitrile-containing perfluorinated vinyl ethers.

The amounts of the copolymerized residues of all the comonomers in the curable fluoroelastomer are complementary. Stated alternatively, the sum of the weight percentages of the copolymerized residues of all the comonomers in the curable fluoroelastomer is 100 wt %.

Suitable fluoroelastomers may be prepared by methods that are known in the art, for example those described in U.S. Pat. No. 5,789,489.

B) Cure System

The cure system used in the curable fluoroelastomer compositions comprises a curative mixture of at least two different dihydrazides. Suitable dihydrazides are described in U.S. Pat. Nos. 8,765,875 and 8,765,876, both issued to Bish et al. Preferred dihydrazides include, without limitation, malonic dihydrazide; succinic dihydrazide; adipic dihydrazide; oxalyl dihydrazide; 1,3-imidazolidinedipropanoic acid, 4-(1-methylethyl)-2,5-dioxo-, 1,3-dihydrazide; tetradecanedioic acid, 1,14-dihydrazide; hexanedioic acid, 2,2,3,3,4,4,5,5-octafluoro-, 1,6-dihydrazide; isophthalic dihydrazide; carbonic dihydrazide; carbonic dihydrazide dihydrochloride; 1,2-hydrazinedicarboxylic acid, dihydrazide; diaminobiuret; and p-phenylene-bis-semicarbazide. More preferred dihydrazides include isophthalic dihydrazide and oxalyl dihydrazide.

The combinations of dihydrazides are chosen to balance or optimize the properties of the cured fluoroelastomers. For example, a dihydrazide curative that acts upon a fluoroelastomer composition to produce a cured fluoroelastomer having given hardness and given elongation at break may be combined with a second, different dihydrazide curative that acts upon the same fluoroelastomer to produce a cured fluoroelastomer having a similar hardness and a different elongation at break. For example, the cured fluoroelastomer resulting from the combination of dihydrazides acting upon the same fluoroelastomer composition may have an elongation at break that is intermediate between those of the cured fluoroelastomers that were produced from the individual dihydrazides.

Curative mixtures of two different dihydrazides are preferred. The two dihydrazides may be combined in a weight ratio of from about 99:1 to about 1:99; from about 49:1 to about 1:49; from about 19:1 to about 1:19; from about 9:1 to about 1:9; from about 5:1 to about 1:5; from about 4:1 to about 1:4; or from about 3:1 to about 1:3. A weight ratio of about 3:1 to about 1:2 is preferred. More preferably, the two different dihydrazides are isophthalic dihydrazide and oxalyl dihydrazide in a weight ratio of isophthalic dihydrazide: oxalyl dihydrazide ranging from about 3:1 to about 1:2 or from about 1:1 to about 2:1.

Optionally, a curative accelerator, e.g. a compound that releases ammonia at curing temperatures, may be used in combination with the dihydrazide curatives. Examples of compounds that decompose to release ammonia at curing temperatures and suitable amounts are described in U.S. Pat. No. 6,281,296 B1 and in U.S. Patent Appln. Publn. No. 2011/00095969.

Optionally, another curative commonly employed to crosslink fluoroelastomers having nitrile-group cure sites may be used in addition to the dihydrazides. Examples of such other curatives include, but are not limited to, diaminobisphenol AF, 2,2-bis(3-amino-4-anilinophenyl)hexafluoropropane, mono- or bis-amidines, mono- or bis-amidrazones, mono- or bis-amidoximes, or an organic peroxide plus coagent.

The total concentration of the cure system in the fluoroelastomer composition may range from about 0.1 to about 4 phr, preferably from about 0.5 to 2 phr. For example, a composition comprising 100 parts by weight of fluoroelastomer may further comprise 0.5 phr of oxalyl dihydrazide and 0.8 phr of isophthalic dihydrazide for a total of 1.3 phr of cure system per 100 phr and a ratio of 1.6:1 of the weight of isophthalic dihydrazide to the weight of oxalyl dihydrazide.

C) Optional Additives

Optional additives that may be used in the fluoroelastomer compositions to improve or optimize various physical properties include, without limitation, carbon blacks, fluoropolymer micropowders, stabilizers, plasticizers, lubricants, fillers (e.g., mineral fillers such as silicas, alumina, aluminum silicate, barium sulfate, titanium dioxide), co-agents, and processing aids. Suitable optional additives have sufficient thermal, chemical, or mechanical stability to be incorporated into the curable fluoroelastomer compositions under their processing conditions, including curing conditions, or to perform satisfactorily under the cured fluoroelastomer compositions' intended service conditions.

Examples of suitable carbon blacks include carbon blacks having particle sizes ranging from about 10 nm (small) to 500 nm (large). An example of small particle size carbon blacks include SAF carbon black, Spheron 6400® and FEF carbon, a highly reinforcing black with typical average particle size of about 14 nm and designated N 110 in Group No. 1, according to ASTM D 1765. A larger carbon black particle, as discussed in U.S. Pat. No. 5,554,680, describes a particular class of carbon blacks that have average particle sizes of at least about 100 nm to about 500 nm as determined by ASTM D 3849. Examples include MT blacks (medium thermal black) designated N-991, N-990, N-908, and N-907, and large particle size furnace blacks, of which MT blacks are preferred.

Blends of small and large particle size carbon blacks may also be used. For example, the larger carbon black particle in a blend of carbon black particles of different particle sizes may be present in an amount ranging from about 40 to 60 phr, and the smaller carbon black particle may be in the range of from 2 to 8 phr.

When present, the total concentration of the optional additive(s) may range from about 0.1 to 200 phr, preferably from about 1 to 100 phr.

Preparation of Curable Fluoroelastomer Compositions

The curable fluoroelastomer compositions may be prepared by mixing the fluoroelastomer, cure system, and optional additives using standard rubber compounding procedures. For example, the components may be mixed on a two-roll rubber mill, in an internal mixer (e.g. a Banbury™ internal mixer), or in an extruder.

Pre-Forms and Articles

The curable fluoroelastomer compositions may be formed into objects of various shapes by physical means, without undergoing any chemical reaction. These uncured objects are known as "pre-forms". The curable compositions may be shaped into pre-forms by any suitable method, such as rolling, molding, die-cutting, or extrusion, for example. The pre-forms may be subjected to curing conditions, such as heat or pressure, to form cured articles.

Alternatively, the curable fluoroelastomer compositions may be formed into blanks having the shape of discs, slabs, or blocks, for example. In addition, the blank may have no set form, if it is cured in the same form in which the curable composition is produced or compounded. The blanks are cured and then machined to form articles comprising the cured fluoroelastomer composition.

The shape and size of the curable composition, before curing, is determined by the dimensions of the machined article.

The cured article or blank may be similar in shape and size to the pre-form or uncured blank from which it is produced, although the dimensions may vary between the two.

In another process for producing articles comprising the cured fluoroelastomer composition, the curable fluoroelastomer composition may be shaped and crosslinked (i.e., cured) by application of heat, pressure, or both heat and pressure to produce a cured article. Molding is generally followed by a post cure cycle during which the press cured composition is heated at an elevated temperature, for example in excess of 300° C., for several hours. When compression molding is utilized, a press cure cycle is preferably also used.

The cured fluoroelastomer compositions have excellent thermal stability, sealing properties, and hot water resistance, and a favorable balance of other properties, including elongation at break, modulus, hardness, compression set, and volume swell. Preferably, the cured fluoroelastomer compositions and the blanks and articles comprising the cured fluoroelastomer compositions have a volume swell, measured according to ASTM D1414:2015 after exposure to 225° C. water for 70 hours, of less than 5%, 8%, 10% or 20%; or an elongation at break, measured according to ASTM D412-06a:2013, of at least 40%, 43%, 46%, 50%, 60%, 70%, 80%, 90%, or 100%.

The curable fluoroelastomer compositions are useful in the production of gaskets, tubing, and seals, for example. Cured articles produced from the curable fluoroelastomer compositions are particularly useful in the oil and gas industry for down-well applications, where the drilling assembly may be exposed to aqueous environments at high temperatures and where the pressures may fluctuate rapidly.

The following examples are provided to describe the invention in further detail. These examples, which set forth a preferred mode presently contemplated for carrying out the invention, are intended to illustrate and not to limit the invention.

EXAMPLES

The examples and comparative examples below illustrate the use of the dihydrazide cure system described herein in the curable fluoroelastomer compositions. In this section, all parts are based on 100 phr, wherein the fluoroelastomer is the rubber, unless otherwise specified in limited circumstances.

Materials

FFKM: A perfluoroelastomer containing 61.9 mole percent of copolymerized units of TFE, 37.4 mole percent of copolymerized units of PMVE, and 0.7 mole percent of copolymerized units of 8-CNVE was prepared according to the general processes described in U.S. Pat. Nos. 5,789,489; 7,977,426; and 7,999,049.

Oxalyl dihydrazide, (CAS #996-98-5) was obtained from Sigma-Aldrich, St. Louis, Mo., USA.

Isophthalic dihydrazide, (CAS #2760-98-7) was obtained from TCI America, Portland, Oreg., USA.

Carbon Black: a thermal carbon black having an average particle size of 280 nm, available as Thermax™ N990 from Cancarb of Medicine Hat, Alberta, Canada.

Plasticizer: A perfluoropolyether available from The Chemours Company FC, LLC, of Wilmington, Del., as Krytox™ XHT-1000.

Test Methods

Modulus/Elongation at Break/Tensile Strength at Break

Modulus, elongation at break, and tensile strength at break were determined according to ASTM D412-06a:2013. Dumbbell shaped test samples (FIG. 2 ASTM D 412-06a Vol. 09-01, die "C") were cut from 2 mm (0.8") thick molded and cured slabs of fluoroelastomer composition. Test samples were conditioned for 3 hours prior to testing at 23° C. and 50% relative humidity.

An Instron Single Station Tensile Machine model #5564 with mechanical grip type contacting extensometer, programmed with Instron Bluehill version 2.6 software, was used for testing at a crosshead speed of 500 mm/min at 23°

C. A minimum of three samples were tested for each composition and the median values of each property are reported.

Shore A Hardness

Shore A hardness was determined according to ASTM D2240-05:2010. Dumbbell shaped test samples (FIG. 2 ASTM D 412-06a Vol. 09-01, die "C") were cut from molded and cured slabs of fluoroelastomer composition. Test samples were conditioned for 3 hours prior to testing at 23° C. and 50% relative humidity before testing.

Testing was conducted on a New Age Hardness Tester with Shore A Head attached at a descent rate of the indentor to the specimen of 3.2 mm/s at a temperature of 23° C. Three measurements were taken on 4-ply stacks of dumbbell specimens die-cut from a molded slab of 2 mm (0.08") thickness. The first measurement is taken from the center of the test sample. The test sample was then turned 180 degrees and a second measurement is taken from the center of the dumbbell. The test sample was turned over and the final measurement taken from the center of the dumbbell. The median of the three results is reported in the tables.

Compression Set

Compression set at constant deflection (25%) was determined according to ASTM D395-14:2014. The sample type was AS-214 O-rings, from which a small section of each O-ring was cut and removed to allow the inside surfaces to be exposed to the same environment as the outside surfaces. For each composition, three AS-214 O-ring samples were compressed and aged at elevated temperature in air or water. After aging, the samples were removed from their compression apparatus, allowed to cool to room temperature, and measured in height to determine the relationship of their original height prior to compression and aging ($h_o$) to their height after compression and aging (h), expressed as the percentage $(h/h_o)*100$. The median of three results for each composition was reported in the tables.

Volume Percent Swell

Volume percent swell was measured according to ASTM D471-12a:2012 on AS-214 O-rings. Before testing, O-rings are weighed in air and in an ethanol/water solution having a specific gravity of 0.820+/−0.001 at 23° C. The O-rings were then aged in distilled water at 225° C. for 70 hours using the aging procedure in ASTM D1414:2015. After aging in distilled water, the O-rings were reweighed in air and the ethanol/water solution to determine percent volume swell. The change in volume was calculated using Archimedes' Principle whereby the density of an article can be determined by obtaining the weight of the article in air and the weight of that article in a fluid of known density. Volume percent swell after aging was calculated in accordance the equation in D471-12a:2012 Section 17.2 (3).

Preparation of Examples and Comparative Examples

Curable fluoroelastomer compositions were compounded on a two-roll rubber mill with the components and in the proportions shown in Tables 1 and 2. O-rings for compression set and volume swell testing were made from these curable fluoroelastomer compositions by press curing at a temperature of 200° C. for a time period to reach t90 plus 5 minutes, followed by a post cure in a nitrogen atmosphere at a temperature of 305° C. for 26 hours. Physical properties of the cured fluoroelastomer compositions are shown in Tables 1 and 2.

TABLE 1

| Formulation (phr) | C1 | C2 | E1 |
| --- | --- | --- | --- |
| FFKM | 100 | 100 | 100 |
| Carbon Black MT N990 | 85 | 85 | 85 |
| Plasticizer | 7.5 | 7.5 | 7.5 |
| Oxalyl dihydrazide | 0.89 | | 0.45 |
| Isophthalic dihydrazide | | 1.75 | 0.88 |
| Physical Properties | | | |
| Elongation at Break (%) | 43 | 77 | 52 |
| Tensile Strength at Break(MPa) | 13.2 | 13.9 | 13.1 |
| Modulus (MPa) at 10% strain | 4.3 | 3.4 | 4.1 |
| Modulus (MPa) at 25% strain | 9 | 7.4 | 7.9 |
| Modulus (MPa) at 50% strain | 14.9 | 11.5 | 12.6 |
| Hardness (Shore A) | 93 | 92 | 93 |
| Compression set (%) (260° C., 70 hours) | 32 | 31 | 31 |
| Compression set (%) (225° C., 70 hours in water) | 56 | 78 | 71 |
| Volume % swell in water 225° C., 70 hrs | 2.3 | 7.6 | 2.8 |

Table 1 shows the properties of the cured fluoroelastomer composition E1 which comprises a mixture of dihydrazides compared to the properties of fluoroelastomer compositions C1 and C2, which comprise only a single dihydrazide as the curing agent. Relative to C1 and C2, E1 contains about half the mass of each dihydrazide respectively. Based on this relationship, it was expected that properties dependent on the cure site structure such as volume swell for E1 would be approximately average between those of the C1 and C2 formulations. However, the measured volume swell of E1 is considerably less than the expected average volume swell based on C1 and C2. Therefore, the measured volume swell of E1 compared to those of C1 and C2 is unexpectedly small, while the balance of other favorable properties such as elongation is maintained.

TABLE 2

| Formulation (phr) | C3 | C4 | E2 |
| --- | --- | --- | --- |
| FFKM | 100 | 100 | 100 |
| Carbon Black MT N990 | 85 | 85 | 85 |
| Plasticizer | 7.5 | 7.5 | 7.5 |
| Oxalyl dihydrazide | 0.89 | | 0.56 |
| Isophthalic dihydrazide | | 1.75 | 0.62 |
| Physical Properties | | | |
| Elongation at Break (%) | 45 | 51 | 48 |
| Tensile Strength at Break(MPa) | 11.0 | 11.5 | 12.7 |
| Modulus (MPa) at 10% strain | 3.0 | 3.2 | 3.3 |
| Modulus (MPa) at 25% strain | 6.8 | 6.5 | 6.9 |
| Modulus (MPa) at 50% strain | 12.6 | 11.3 | 12.4 |
| Hardness (Shore A) | 93 | 93 | 93 |
| Compression set (%) (260° C., 70 hours) | 22 | 22 | 22 |
| Compression set (%) (225° C., 70 hours in water) | 61 | 76 | 64 |
| Volume % swell in water 225° C., 70 hrs | 0.9 | 3.8 | 2.0 |

Table 2 shows the properties of the cured fluoroelastomer composition E2, which comprises a mixture of dihydrazides in a different ratio of isophthalic dihydrazide to oxalyl dihydrazide, compared to the properties of fluoroelastomer compositions C3 and C4, which comprise only a single dihydrazide as the curing agent. The volume swell of E2 is considerably less than the expected volume swell based on C3 and C4. Therefore, the measured volume swell of E2 compared to those of C3 and C4 is unexpectedly small, while the balance of other favorable properties such as elongation is maintained.

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A curable fluoroelastomer composition comprising:
   A) at least one fluoroelastomer comprising copolymerized units of a nitrile group-containing cure site monomer;
   B) a cure system comprising at least two different dihydrazides, wherein the cure system comprises isophthalic dihydrazide and oxalyl dihydrazide; and optionally
   C) at least one additive.

2. The curable fluoroelastomer composition of claim 1, wherein the at least one fluoroelastomer comprises copolymerized units of:
   i) at least one fluorinated olefin;
   ii) at least one fluorovinyl ether; and
   iii) at least one nitrile group-containing cure site monomer selected from the group consisting of nitrile group-containing perfluorinated olefins and nitrile group-containing perfluorinated vinyl ethers.

3. The curable fluoroelastomer composition of claim 2, wherein the at least one fluorinated olefin is selected from the group consisting of 1,1-difluoroethylene ($C_2H_2F_2$); hexafluoropropylene (HFP); tetrafluoroethylene (TFE); 1,2,3,3,3-pentafluoro-propene (1-HPFP); 1,1,3,3,3-pentafluoropropene (2-HPFP); chlorotrifluoro-ethylene (CTFE); 1,1,2-trifluoroethylene; 1-fluoroethylene; and a combination of two or more of 1,1-difluoroethylene; hexafluoropropylene; tetrafluoroethylene; 1,2,3,3,3-pentafluoro-propene; 1,1,3,3,3-pentafluoropropene; chlorotrifluoro-ethylene; 1,1,2-trifluoroethylene; and 1-fluoroethylene.

4. The curable fluoroelastomer composition of claim 2, wherein the at least one fluorinated olefin is selected from the group consisting of tetrafluoroethylene, hexafluoropropylene, and a combination of tetrafluoroethylene and hexafluoropropylene.

5. The curable fluoroelastomer composition of claim 2, wherein the at least one fluorovinyl ether is selected from the group consisting of perfluoro(methyl vinyl) ether; perfluoro(ethyl vinyl) ether; perfluoro(propyl vinyl) ether; $CF_3O-(CF_2O)_n-CF_2CF_2-OCF=CF_2$, where n is 0, 1, 2, 3, 4 or 5; and a combination of two or more of perfluoro(methyl vinyl) ether; perfluoro(ethyl vinyl) ether; perfluoro(propyl vinyl) ether; and $CF_3O-(CF_2O)_n-CF_2CF_2-OCF=CF_2$, where n is 0, 1, 2, 3, 4 or 5.

6. The curable fluoroelastomer composition of claim 2, wherein the at least one nitrile group-containing cure site monomer comprises perfluoro(8-cyano-5-methyl-3,6-dioxa-1-octene).

7. The curable fluoroelastomer composition of claim 1, wherein the at least one additive is present and comprises one or more additives selected from the group consisting of carbon black, lubricants, fillers, fluoropolymer micropowders, stabilizers, plasticizers, and processing aids.

8. The curable fluoroelastomer composition of claim 1, wherein the at least one additive comprises at least one filler selected from the group consisting of a silica, an alumina, an aluminum silicate, a barium sulfate, a titanium dioxide, and a combination of two or more of a silica, an alumina, an aluminum silicate, a barium sulfate, and a titanium dioxide.

9. The curable fluoroelastomer composition of claim 1, wherein the weight ratio of isophthalic dihydrazide to oxalyl dihydrazide ranges from about 3:1 to about 1:2.

10. The curable fluoroelastomer composition of claim 1, in the shape of a blank or a pre-form.

11. A cured fluoroelastomer composition that is the product of curing the curable fluoroelastomer composition of claim 1.

12. The cured fluoroelastomer composition of claim 11, that has a volume swell, measured according to ASTM D1414:2015 after exposure to 225° C. water for 70 hours, of less than 10% or 8%; or an elongation at break, measured according to ASTM D412-06a:2013, of at least 43% or 46%.

13. An article comprising the cured fluoroelastomer composition of claim 11.

14. The article of claim 13 in the form of a gasket, tube, seal, or O-ring.

15. A cured article of claim 13 having a volume swell, measured according to ASTM D1414:2015 after exposure to 225° C. water for 70 hours, of less than 10% or 8%; or an elongation at break, measured according to ASTM D412-06a:2013, of at least 43% or 46%.

* * * * *